US010600438B2

(12) United States Patent
Ramakrishnan

(10) Patent No.: US 10,600,438 B2
(45) Date of Patent: Mar. 24, 2020

(54) SURFACE ACOUSTIC WAVE-BASED SENSING AND ACTUATION OF CONTAMINATION

(71) Applicant: Seagate Technology LLC, Cupertino, CA (US)

(72) Inventor: Narayanan Ramakrishnan, New City, NY (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 16/369,297

(22) Filed: Mar. 29, 2019

(65) Prior Publication Data
US 2019/0325904 A1 Oct. 24, 2019

Related U.S. Application Data
(60) Provisional application No. 62/659,181, filed on Apr. 18, 2018.

(51) Int. Cl.
G11B 33/14 (2006.01)
G11B 5/60 (2006.01)
H02N 2/08 (2006.01)
H02N 2/00 (2006.01)

(52) U.S. Cl.
CPC .......... *G11B 5/6076* (2013.01); *G11B 5/6058* (2013.01); *G11B 5/6082* (2013.01); *H02N 2/08* (2013.01)

(58) Field of Classification Search
CPC ..... G11B 33/14; G11B 33/1446; G11B 5/825; G11B 5/314; G11B 5/09; G11B 5/00; G11B 2005/0005; G11B 11/10504; G11B 5/1278; G11B 5/4907; G11B 5/4938; H01L 41/00; H01L 41/04; H02N 2/00; H02H 9/135
USPC ........... 360/75, 71, 97.12; 720/671; 134/184
See application file for complete search history.

(56) References Cited

U.S. PATENT DOCUMENTS

| 6,196,062 | B1 | 3/2001 | Wright et al. |
| 6,285,113 | B1 | 9/2001 | Asai et al. |
| 6,503,132 | B2 | 1/2003 | Ekstrum et al. |
| 6,710,511 | B2 | 3/2004 | Asai |
| 6,776,176 | B1 | 8/2004 | Kino |
| 6,989,966 | B2 | 1/2006 | Rajakumar |
| 9,190,108 | B2 | 11/2015 | Engelkes et al. |

(Continued)

OTHER PUBLICATIONS

"Semiconductor Physics Group—Surface Acoustic Waves (SAWs)", downloaded from https://www.sp.phy.cam.ac.uk/research/fundamentals-of-low-dimensional-semiconductor-systems/saw, 5 pages, downloaded on May 20, 2016.

(Continued)

Primary Examiner — Nabil Z Hindi
(74) Attorney, Agent, or Firm — Kagan Binder, PLLC

(57) ABSTRACT

A method includes producing a first surface acoustic wave (SAW) on a magnetic head slider using a first interdigitated transducer (IDT), wherein the SAW has a first set of wave characteristics. The method also includes receiving the first SAW at a second IDT on the magnetic head slider. The method also includes analyzing the SAW for a second set of wave characteristics. The method also includes determining, based on the analyzing, that a substance having at least one characteristic is located in a path of the SAW on the magnetic head slider.

20 Claims, 12 Drawing Sheets

(56) References Cited

U.S. PATENT DOCUMENTS 9,214,173 B2 12/2015 Kunkel et al.
2006/0117335 A1* 6/2006 Kino .................. G11B 7/122
720/671

OTHER PUBLICATIONS

Garrido, Jose Antonio, "Rayleign Surface Acoustic Wave (SAW) devices" Accessed May 20, 2016.
Verma, Shreesh Mohan and Agarwal, Tanuj, "Surface Acoustic Wave (SAW) based sensors" published May 7, 2013, accessed Aug. 12, 2016.

* cited by examiner

SURFACE ACOUSTIC WAVE-BASED SENSING AND ACTUATION OF CONTAMINATION

CROSS-REFERENCE TO RELATED APPLICATIONS

This application claims the benefit of U.S. Provisional Patent Application No. 62/659,181, filed Apr. 18, 2018 and titled "Surface Acoustic Wave-Based Sensing and Actuation of Contamination", the entire contents of which are incorporated herein by reference in their entirety.

BACKGROUND

The present disclosure relates to aspects of magnetic head sliders ("sliders") within hard-disk drives (HDDs), and relates in particular to improved slider performance.

HDDs are data storage devices that include one or more rotatable disks to which data is written and read by way of one or more magnetic read/write heads that are movably supported with respect to surfaces of the disks by a like number of head suspension assemblies, which are typically movably supported relative to a respective disk surface so that a magnetic read/write head can be selectively positioned relative to a circular data track of the disk surface. Such head is typically provided on an aerodynamically-designed slider so as to fly closely, at a so-called "fly height," of several nanometers above the disk surface while the disk is spinning. Each slider can be aerodynamically shaped to have various surfaces, including an air-bearing surface (ABS), which faces the spinning disk. The slider may also have a trailing edge (TE), which follows or "trails" the ABS with respect to the relative movement of the slider and the magnetic disk surface. Each head suspension assembly is normally connected to a rotatable drive actuator arm and load beam for rotatably moving a slider for data writing and reading during HDD operation. Sliders, as used herein (in conjunction with a spinning disk surface), may form what are referred to as advanced air bearings (AABs).

Disk surfaces have experienced increasing data density per unit area, known as areal density, as HDDs have continued to increase in storage capacity. Specifically, individual data tracks on the disk surfaces have become narrower and the radial spacing between tracks has decreased. Technologies such as heat-assisted magnetic recording (HAMR) and shingled magnetic recording (SMR) have led to greater areal density and closer-spaced data tracks. An increasing desire and need for magnetic head read/write precision in conjunction with smaller fly heights has led to greater magnetic read/write sensitivity and slider proximity to the disk surfaces.

An HDD assembly is typically a tightly-sealed structure. During assembly, an HDD is produced in an environment where minimal foreign particles and/or contaminants enter the HDD. However, contamination might get in during assembly or eventually enter an HDD, including contamination that can settle on sensitive disk or slider surfaces. Lubricant liquid and/or droplets may also be present on various surfaces, sometimes intentionally, and are included in the intended scope of "contaminants," for the purposes of this disclosure. Contaminants may take the form of liquids, droplets, films, or otherwise. With recent developments, including increasing areal density and reduced slider fly height and increased head precision, contamination (e.g., droplets) had not typically been problematic to a slider during HDD operation. With shrinking fly heights and head to disk clearance, present-day HDD sliders are increasingly more susceptible to contaminant droplet pick-up or other disturbances.

Contaminant build-up on a slider, once large enough, can lead to contaminants dripping or falling from the slider onto the disk surface, below. This dripping can form a contaminant concentration or "pool," which may continue to grow and can cause a variety of problems. To reduce the likelihood of negative performance effects, the contaminants can be removed, dispersed, or cleaned from the slider surface using various contaminant actuation methods and structures. Contaminant actuation can occur prior to, during, or after substantial build-up of contaminants on a slider surface or disk surface below. However, existing methods for cleaning surfaces of a slider, especially a TE, each have significant drawbacks.

Several solutions have been proposed in the past for detection of contaminants (e.g., droplets) at the TE and for actuation or removal of the contaminants (e.g. dual-ended temperature coefficient of resistance [DETCR] and capacitance-based detection). Some examples of existing methods of removal include TE micro-channel, electrowetting, self-assembled monolayer (SAM) hydrophobic coatings, SAM patterning, among others.

Although some solutions exist for removal of TE contamination, the existing solutions suffer from various disadvantages and drawbacks. Some drawbacks include long times for removal of the contaminants (e.g. by electrowetting, SAM patterning, etc.), or risk of blocking channels (e.g., a TE micro-channel) for contaminant removal. In some existing cases, suspension of normal drive operation can be necessary for a duration that is long enough to remove the contaminants by external actuation. Once the drive operation is suspended, the contaminants can be removed with a fast seek-settle outside a read/write zone of a head, electrowetting on dielectric (EWOD)-based actuation, among other techniques.

Due to the nature of existing methods of contaminant sensing, noise and precision issues are often present, which can lead to undesirably low signal-to-noise ratios (SNRs) during contaminant sensing, which can have a negative impact on head read/write performance. One example cause of low SNR during sensing in the existing art can include temperature sensitivity of DETCR-based TE contaminant sensing, among others.

Thus, existing methods for removal of contaminants from various surfaces of a slider, such as the TE, suffer from drawbacks such as slow response times and undesirable suspension of operations during cleaning operations. Therefore, the problem of contamination and lubricant build-up on the TE of a slider has led to a need and desire for improved methods and systems for the removal of harmful contaminants from a slider surface without also correspondingly affecting HDD read/write operations.

SUMMARY

The present invention overcomes various disadvantages and shortcomings of the prior art relating to performance roadblocks to slider and disk drive technology. Through disclosed methods and structures, magnetic head slider TE sensing and actuation of contaminants can be improved by employing surface acoustic wave-based sensing and actuation of contaminant and lubricant droplets. Actuation of contaminants can include displacing, removing, or otherwise interacting with contaminants with the surface-acoustic wave. High-sensitivity and high-fidelity detection and efficient actuation or removal of contaminants can thus be achieved.

One benefit of the described methods and structures includes a high fidelity of contamination detection and fast removal compared to existing methods. Other benefits includes more power-efficient contamination removal schemes when compared to existing active removal schemes.

According to a first aspect of the present disclosure, a method is disclosed. The method includes producing a first surface acoustic wave (SAW) on a magnetic head slider using a first interdigitated transducer (IDT), wherein the SAW has a first set of wave characteristics. The method also includes receiving the first SAW at a second IDT on the magnetic head slider. The method also includes analyzing the SAW for a second set of wave characteristics. The method also includes determining, based on the analyzing, that a substance having at least one characteristic is located in a path of the SAW on the magnetic head slider.

According to a second aspect of the present disclosure, a head slider apparatus for use in a hard-disk drive is disclosed. The apparatus includes a controller in communication with a first interdigitated transducer (IDT) and a second IDT. The apparatus also includes a leading edge, a trailing edge, and an air bearing surface The apparatus also includes the first IDT being located on the trailing edge and having a first interdigitated spacing configured to interface with a piezoelectric substrate to create a first surface acoustic wave (SAW) having an first wavelength and an first amplitude. The apparatus also includes the second IDT configured to receive the first SAW created by the first interdigitated transducer, the received first SAW having a second wavelength and second amplitude. The apparatus also includes that the controller is configured to analyze the received first SAW by comparing the second wavelength to the first wavelength and the second amplitude to the first amplitude, to determine whether a contaminant is located on the trailing edge.

According to a third aspect of the present disclosure, a head slider apparatus for use in a hard disk drive is disclosed. The apparatus includes a controller in communication with a first interdigitated transducer (IDT) and a second IDT. The apparatus also includes a leading edge, a trailing edge, and an air bearing surface. The apparatus also includes the first IDT being located on the air bearing surface and having a first interdigitated spacing configured to interface with a piezoelectric substrate to create a first surface acoustic wave (SAW) having an first wavelength and an first amplitude. The apparatus also includes the second IDT configured to receive the first SAW created by the first interdigitated transducer, the received first SAW having a second wavelength and second amplitude. The apparatus also includes that the controller is configured to analyze the received first SAW by comparing the second wavelength to the first wavelength and the second amplitude to the first amplitude, to determine whether a contaminant is located on the air bearing surface.

According to a fourth aspect of the present disclosure, a method is disclosed. The method includes receiving a first set of wave characteristics. The method also includes determining, based on the first set of wave characteristics, that a substance having at least one characteristic is located on a trailing edge surface of a magnetic head slider. The method also includes producing a first surface acoustic wave (SAW) on the trailing edge surface of the magnetic head slider using a first interdigitated transducer (IDT), based on the first set of wave characteristics such that the substance is actuated.

BRIEF DESCRIPTION OF THE DRAWINGS

Other important objects and advantages of the present invention will be apparent from the following detailed description of the invention taken in connection with the accompanying drawings.

DETAILED DESCRIPTION

The foregoing specific embodiments of the present invention as set forth in the specification herein are for illustrative purposes only. Various deviations and modifications may be made within the spirit and scope of the invention without departing from the main theme thereof.

Figure 1:
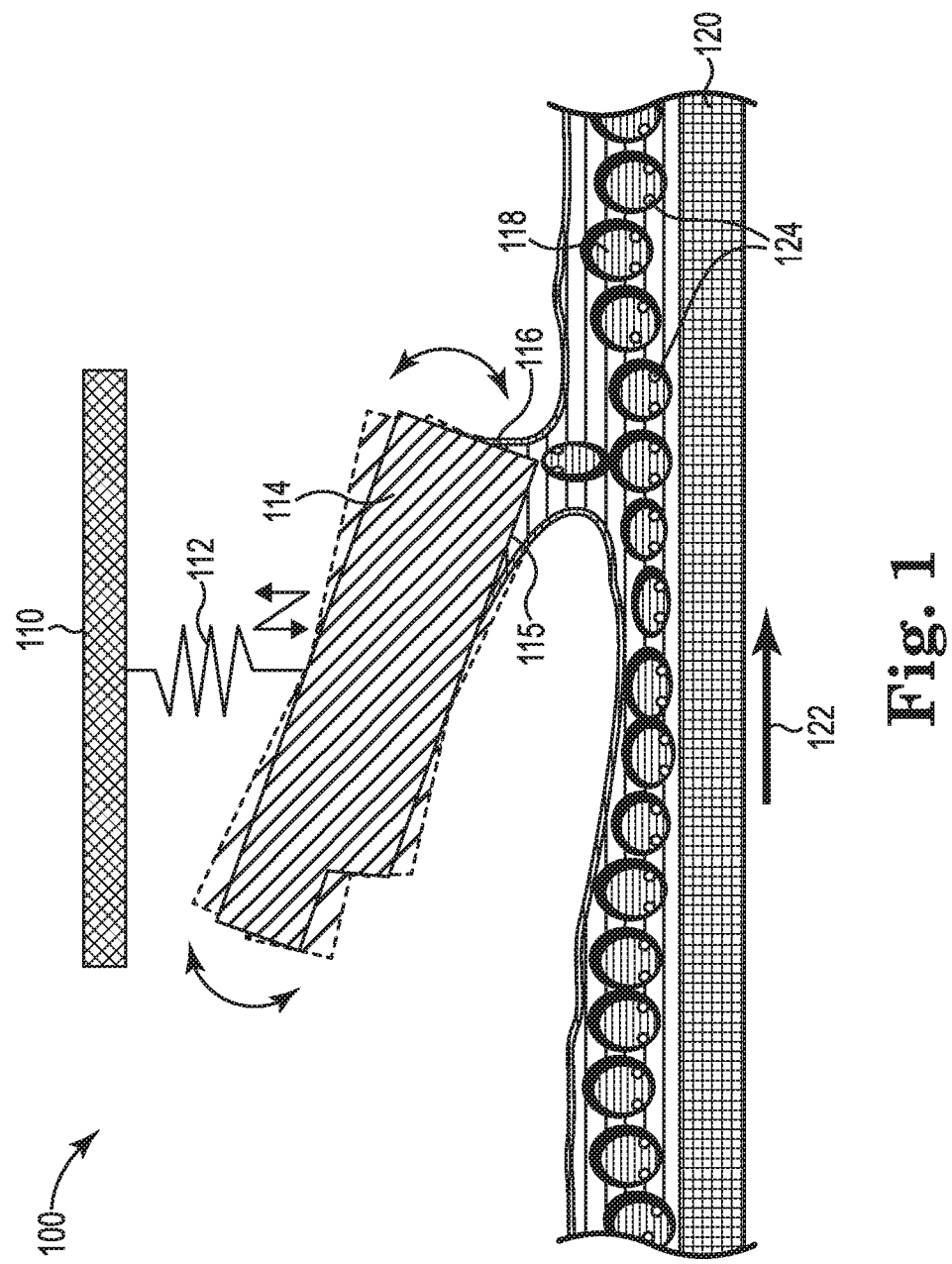
FIG. 1 is a schematic representation of a head/disk interface with ultra-small spacing showing contaminant droplets that are picked up onto a flying slider, which affects the flying characteristics and read/write performance of a hard-disk drive.

FIG. 1 is a schematic representation 100 of a head/disk interface (HDI) with ultra-small spacing showing contaminant droplets 118 that can be picked up onto a flying slider 114, as described below. The contaminant droplets can affect the flying characteristics and read/write performance of a hard-disk drive (HDD).

During HDD operation, as described above, a slider 114 flies over a spinning magnetic disk 122, creating some separation called a fly height. The slider 114 is pivotably mounted to a load beam 110 using a flexible head suspension 112 (shown conceptually and not necessarily to scale). The flexible head suspension 112 may include various flexures and/or gimbals, as known. The surface of the spinning magnetic hard disk 120 may optionally include a carbon overcoat located at a top surface of the hard disk 120. An example carbon overcoat may be a diamond-like coating (DLC) and may be extremely smooth. The carbon overcoat may serve as a corrosion and wear barrier to the recording medium (magnetic disk layer), below. The slider 114, as shown, is angled to fly above the surface of the hard disk 120. As shown, the hard disk 120 is configured to be spun (e.g., by a motor, not shown) in the rotational direction shown by arrow 122 (from left to right).

Contaminant droplets 118 composed of various substances can be present on the surface of the hard disk 120 (and therefore on a carbon overcoat of the hard disk 120 surface, if present) within an HDD, as described above. When a slider 114 moves relative to the spinning hard disk 120 in direction 122, contaminant droplets 118 may gather on an ABS 115 and/or a TE 116 (having a TE surface) of the slider 114. Gathered or "pooled" contaminant droplets 118 may disrupt normal or ideal read/write operation for various reasons. Various contaminant droplets 118 may be present in the HDD intentionally, incidentally, and/or unavoidably, depending on specification and/or environmental factors. Therefore, as described herein, there is a desire to devise new ways to keep head surfaces (e.g., ABS 115, TE 116) of the slider 114 clear enough of the aforementioned contaminant droplets 118, for effective HDD operation, where possible.

As depicted, contaminant droplets 118 tend to accumulate at an area of the slider 114 near the intersection of TE 116 and the ABS 115. Accumulation on these surfaces may then form larger build-ups of contaminant droplets 118 or other contamination build-up (as shown on slider 114 at intersection with contaminant droplets 118 near the hard disk 120 surface) as accumulation continues. The build-up on the ABS and/or TE may have a direct effect on the read/write performance of the slider 114, including a loss of precision and an increase in noise during operation. Contaminant droplets 118 may include various end groups and lubricants 124, such as perflouropolyether (PFPE), according to various embodiments.

Following cumulative contaminant droplet slider 114 pick-up at ABS 115 and/or TE 116, contaminant droplets 118 can become increasingly built-up and more likely to then drop from the slider 114 to the hard disk 120 surface, below, particularly if the slider 114 is disturbed. Although contaminant droplets 118 can be picked up by the slider 114, the contaminant droplets can therefore also drop back to the surface of the hard disk 120 at various times. Contaminant droplets 118 may be especially prone to drop to the hard disk 120 surface during disturbances due to sudden accelerations, including shock and/or vibration events. In particular, if and when the contaminant droplets 118 fall to the hard disk 120 surface, the contaminant droplets 118 can form substantial puddles that can then harmfully interact or interfere with the protruded TE 116 of the slider 114, e.g., during read/write operation. Example consequences due to interference with the protruded TE 116 of the slider 114 include skip-write errors and retries for read, which can adversely affect data integrity and slider 114 read/write performance.

Indirectly related to slider 114 read/write operation are the flying characteristics of slider 114, which can also be affected due to the contaminant droplet 118 build-up on the TE 116 and/or ABS 115. As is known, very small variations to the ABS of slider 114 can have substantial impacts on the flying characteristics, such as slider 114 pitch and roll. Through changes to the aerodynamic contours of the slider 114, aerodynamic precision and controllability of the slider 114 can be substantially negatively affected. As shown and described, sensing of contamination at the TE 116 and subsequent corrective actions for removal of the contaminant droplets 118 is therefore of significant importance.

Figure 2A:
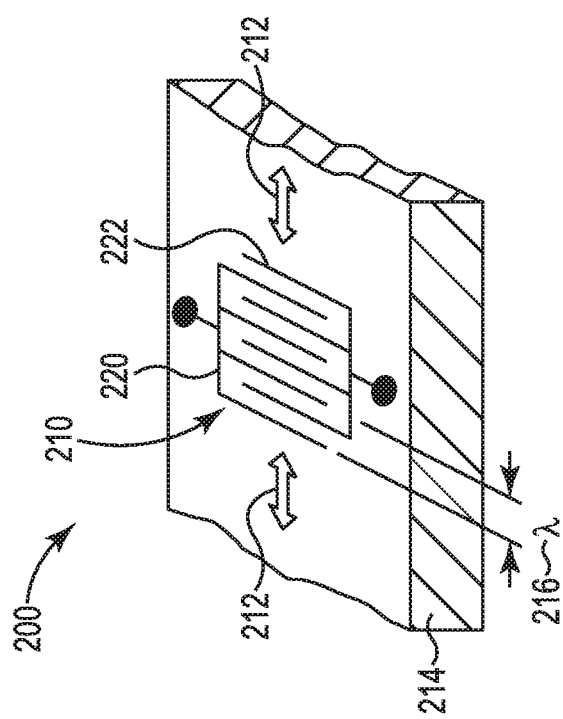
FIG. 2A-2B are schematic representations of an IDT located on the surface of a substrate, according to various embodiments.
Figure 2B:
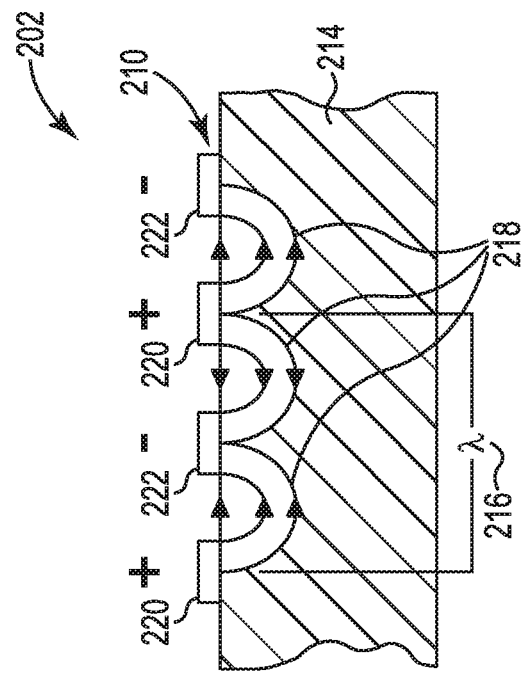

FIG. 2A-2B are schematic representations of an IDT 210 located on the surface of a substrate 214.

Figure 3:
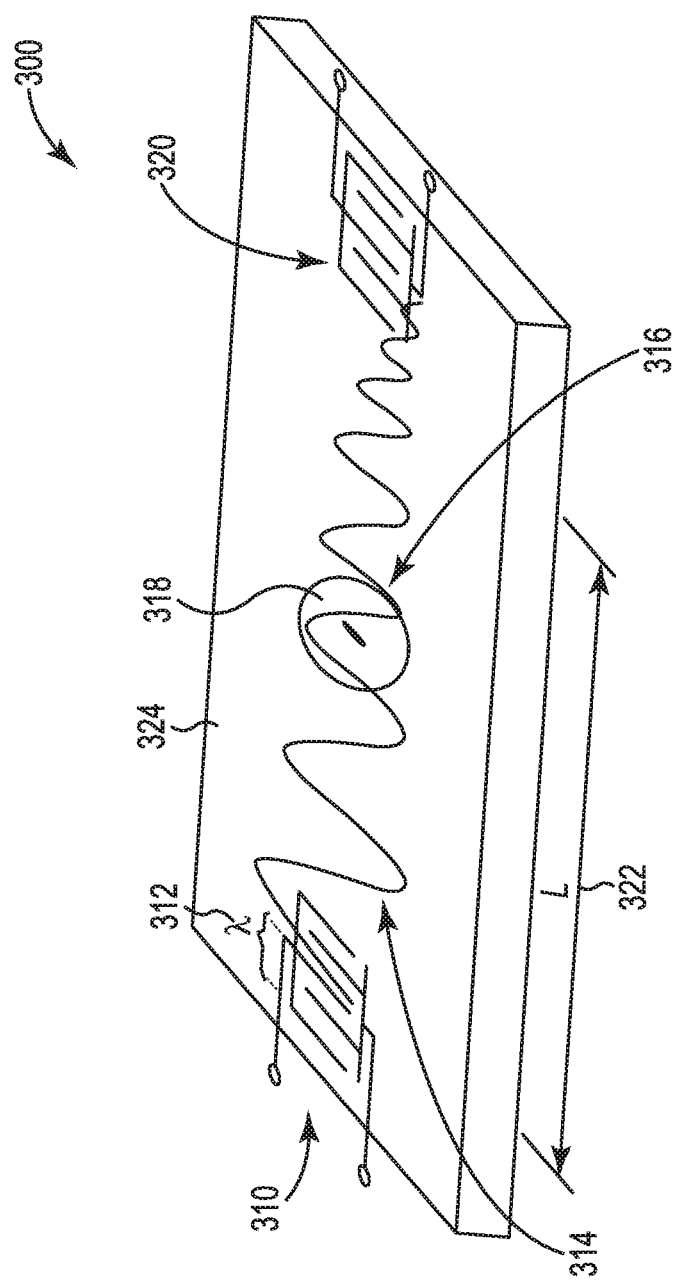
FIG. 3 is a conceptual representation of a surface-acoustic wave (SAW) device utilizing a SAW to actuate or sense a contaminant droplet, according to various embodiments.
Figure 4:
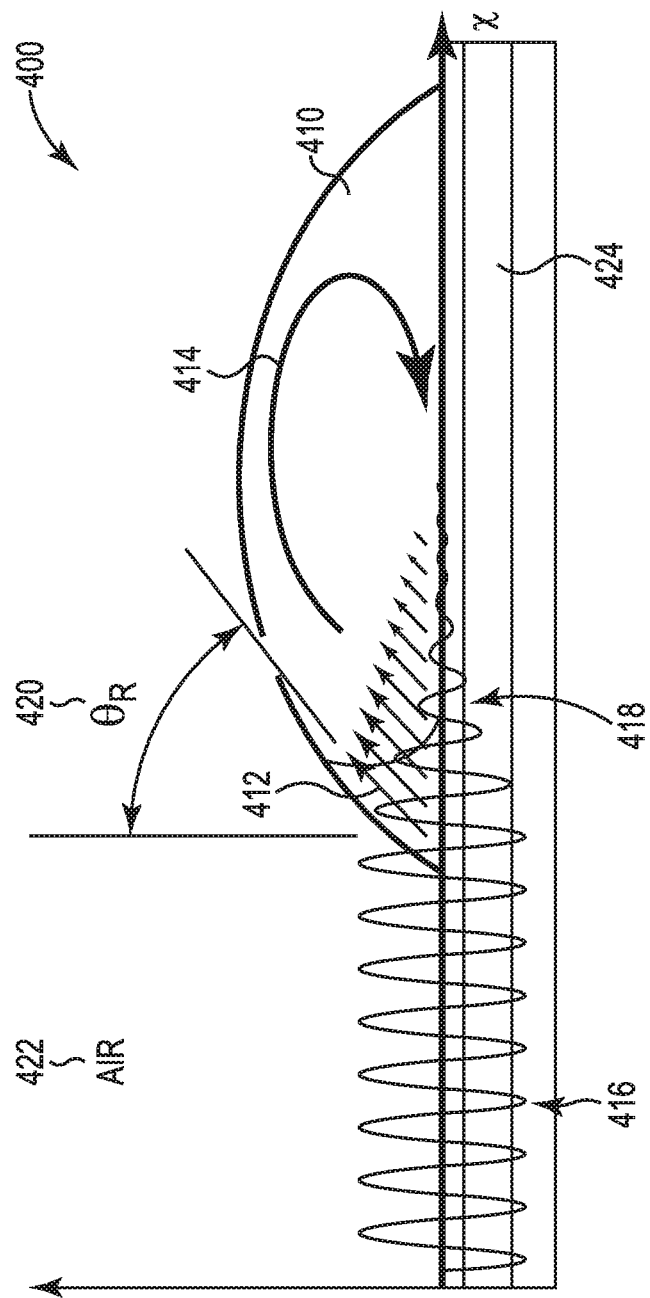
FIG. 4 is a perspective diagram showing a propagating leaky SAW actuating a contamination droplet, according to various.

Example IDT 210 represents a microelectromechanical system (MEMS) configured to produce (and/or receive) a mechanical or surface acoustic wave (SAW) in a substrate 214 or on a surface thereof. A SAW is a type of acoustic wave that travels primarily along a surface of a substrate 214 of a solid substance that has a degree of elasticity, e.g., along directions depicted by arrows 212. The elastic substance of substrate 214 may preferably be a piezoelectric substance. The substance or substrate 214 may be a thin film or a bulk substance, according to various embodiments. A SAW (e.g., as shown in FIGS. 3 and 4) has a characteristic of variable amplitude, where the amplitude is greatest at the surface of the elastic substance, and least at greater depths into the sub stance.

In general, a mechanical displacement of a substance due to a SAW decays exponentially away from the surface, so that most (e.g., more than 95%) of the energy of the SAW is configured within a depth equal to one wavelength of the SAW. When a SAW is produced by an IDT, generally an electromagnetic (EM) radiation signal or waveform is also created at the IDT, and radiates or is transmitted therefrom. SAWs typically travel at a speed on the order of 3,000 meters per second through the substrate 214, meaning that the SAW travels much slower than the associated EM radiation, such that a delay line can be formed to compare a time of an IDT receiving a SAW and the associated EM transmission. A delay line, as used herein, can be defined by a space between two IDTs, across which a SAW may travel, e.g., on a slider trailing edge. This space has a length, and a SAW travels the length more slowly than its EM form, causing a measurable delay which may serve various functions.

An input electrical signal can be transduced by IDT 210 into a SAW, which can be affected by and used to sense or detect various physical phenomena. Either the same IDT 210 or a second IDT (not shown) then transduces the same SAW back into an electrical signal, at which point various changes to wave characteristics of the SAW, e.g., amplitude, phase, frequency, time delay, and direction of propagation can be interpreted and compared to the initial or first SAW wave characteristics. By comparing the initial or first to the final or second SAW wave characteristics, a presence of a physical phenomenon can be measured and analyzed according to various suitable methods, as appropriate.

As shown with respect to FIG. 2A, IDT 210, is a device configured to produce or receive a SAW that can be guided, restricted or otherwise modified or manipulated while propagating. IDT 210, as shown, includes two interleaved arrays of electrodes 220, 222 seen in FIG. 2A from a perspective surface view and seen in FIG. 2B from a side profile view. The interleaved arrays of electrodes 220, 222 may be made of a metal film, and may be deposited on the piezoelectric substrate 214. The widths of the individual electrode protrusions may preferably equal the inter-electrode width gaps, which may maximize conversion of electrical to mechanical signal, and vice-versa. In other words, the widths of the individual protrusions the electrodes 220, 222 may preferably be similar to the separation distance between the protrusions. An example protrusion width may be roughly 0.3 micrometers, which may permit IDT 210 to transmit or receive a 3 gigahertz (GHz) frequency. The piezoelectric substrate 214 may be made of quartz, lithium niobate, lithium tantalite, zinc oxide, or bismuth germanium oxide, among others. The various substances that make up the substrate 214 may have various piezoelectric coupling coefficients and/or temperature sensitivities, depending on the application.

IDT 210 can form a one-port resonator, and therefore can optionally both produce and receive a SAW, or take the form of a delay line, employing two IDTs (see FIG. 3) paired such that one IDT produces and one IDT receives the SAW. Input and output IDTs may be substantially similar or significantly different based on various applications and functions. Differences may include electrode (e.g., electrode protrusion) overlaps, electrode numbers, and/or electrode positioning, among others. IDT electrodes 220, 222 may be composed of metal and may form a structure resembling a pair of interlocking combs, each with a plurality of electrode protrusions, as shown. IDT 210 has an electrode protrusion spacing (i.e., electrode aperture pitch) and associated transmission wavelength, λ, 216, as shown, which is defined by the spacing and formation of the electrodes. λ, 216, according to the shown embodiment, is defined as the distance from two adjacent, like-charge electrode protrusions. The electrodes may be disposed on the surface of a piezoelectric substrate 214, such as quartz ($SiO_2$) or lithium niobate ($LiNbO_3$), to form a periodic structure. Alternatively, IDT 214 may be disposed within a substrate 214, which may be a bulk wafer and/or (e.g., piezoelectric) substance.

In some embodiments, IDT 210 may be configured to convert electric signals to SAWs by generating periodically-distributed mechanical forces via a piezoelectric effect. The generation of a SAW by IDT 210 may represent an input IDT. Conversely, the same principle in reverse may be applied to convert the SAW back to an electric signal. The receipt and conversion of the SAW may represent an output IDT. These processes of generation and reception of SAW can be used in different types of SAW signal processing devices, such as band pass filters, delay lines, resonators, sensors, etc., as known.

According to various embodiments, IDT 210 can form part of a so-called delay line, as described herein, in which electrodes 220, 222 are preferably uniformly spaced such that the phase is a linear function of the frequency. According to other embodiments, IDT 210 can form part of a SAW resonator, where IDTs are used to convert electrical to mechanical signals, and vice-versa (but do not receive amplitude and phase characteristics). In a resonator, one or more SAW "acoustic" reflectors may be used with a single IDT (e.g., IDT 210), where metal stripes or grooves of a depth reflect a SAW (seen best in FIG. 6), whereas delay lines typically utilized at least two IDTs.

FIG. 2B illustrates an example cross-sectional view 202 and an electric field map produced in a piezoelectric substrate 214 between positive 220 and negatively-charged 222 electrodes of IDT 210, with a characteristic wavelength λ 216, equivalent to a regular spacing between two nearest, like-charge protrusions of a single polarity electrode (separated by an oppositely-charged electrode protrusion), either positive 220 or negative 222, as described above. Electric field lines 218 are shown pointing from positive 220 to negative 222 electrodes, which form an alternating pattern every wavelength λ 216. Electric field lines 218, as shown, may pass through substrate 214.

FIG. 3 is a conceptual representation of a SAW device 300 utilizing a SAW 316 to actuate or sense a contaminant droplet 318, according to various embodiments.

A SAW device 300 layout, as shown may be a delay line. The delay line includes two IDTs (input IDT 310 and output IDT 320) located on a piezoelectric substrate 324. As shown, an input IDT 310 has an electrode protrusion spacing of λ 312, and substrate 324 has an inter-IDT spacing of L 322, which preferably represents a distance that a SAW 314 will travel between IDTs 310 and 320. According to one delay line embodiment, input IDT 310 begins by transmitting a SAW 314 having a first set of wave characteristics, and an output IDT 320 then receives a leaky SAW 316 having a second set of wave characteristics.

Still with reference to FIG. 3, the leaky SAW 316 is created by SAW 314 interacting with contamination droplet 318 located on the surface of substrate 324. The input IDT 310 with an initial radio frequency (RF) voltage input can create SAW 314 on piezoelectric substrate 324. The output IDT 320 then preferably senses the leaky SAW 316 and converts the received wave characteristics into an oscillatory (e.g., RF) voltage signal using known methods and/or systems.

When a contaminant droplet 318, e.g., in bulk, lies on the propagation path of an emitted SAW, the SAW changes mode into a leaky SAW and damps exponentially when reaching the contaminant droplet 318. The contaminant droplet 318, in some example, includes an oil-based substance. A leaky SAW denotes a SAW that has at least one characteristic, such as amplitude, frequency, phase, or time delay, which measurably attenuates in the presence of a contaminant droplet 318 (or other liquid) droplet or film on the substrate 324. Changes to amplitude, frequency, etc., for example, can be sensed and analyzed. Once analyzed, the presence, location, and characteristics of contaminant droplet 318 on the substrate surface can be detected, and appropriate methods and procedures for contaminant droplet 318 removal can be determined or deduced.

As used herein, actuation as used with respect to one or more contaminant droplets 318 on a TE or other slider surface, can involve using properties in SAWs to physically affect the contaminant droplet 318 in various ways. Preferably, actuation of the contaminant droplet 318 can caused the contaminant droplet 318 to be removed or displaced from the TE or order slider surface. In other embodiments, the actuation of the contaminant droplet 318 on the surface can involve moving, reshaping, heating, or otherwise affecting the contaminant droplet 318 or any constituents thereof. By using a SAW 314 for actuation of a contaminant droplet 318, longitudinal pressure waves may be created by input IDT 310 and may propagate into the contaminant droplet 318 at an angle such that the contaminant droplet 318 is actuated. In one example, the angle that the SAW propagates into the contaminant droplet 318 can be a Rayleigh angle ($\theta_R$) defined as $\theta_R = \sin^{-1}(C_{liquid}/C_s)$, where $C_s$ is the SAW 314 velocity in the substrate 324. Rayleigh waves having Rayleigh angles are described in greater detail with reference to FIG. 4, below.

As the SAW propagates into the contaminant droplet 318, the SAW preferably radiates pressure waves in order to induce an acoustic force in the contaminant droplet 318, which can result in actuation in the form of a bulk liquid circulation (e.g., heating, see also FIG. 4) within the contaminant droplet 318. With or without the bulk liquid circulation, actuation can also take the form of acoustic streaming, or the movement of the contaminant droplet from one location to another. Upon the contaminant droplet 318 receiving the actuating SAW 314 from the input IDT 310, the contaminant droplet 318 can be actuated at an acoustic streaming propulsion rate (speed) of up to several mm/sec, according to various embodiments.

Wavelength λ 312 can be equal to a width or pitch of IDT 310 (as shown) and SAW frequency is $f_0=v/\lambda$, where v=velocity of sound in the piezoelectric substrate 324. According to one embodiment, RF oscillation frequency may be set to $f_0$ for maximum SAW 314 excitation, actuation, or propagation efficiency. As used herein, the SAW 314, as it propagates across substrate 324, may take an amount of time to arrive at output IDT 320 from the input IDT 310, with a delay line time of t=L/v in a delay line example.

A presence of a contaminant droplet 318 in the SAW 314 acoustic pathway causes change in SAW 314 velocity, "v" (in addition to SAW 314 amplitude change), resulting in signal delay (dt) and therefore frequency shift df~dt that can be detected, according to various embodiments.

FIG. 4 is a perspective diagram 400 showing a propagating leaky SAW 418 actuating a contamination droplet 410.

A Rayleigh wave is a type of SAW that travels near the surface of a solid, such as a piezoelectric/substrate layer 424 of a slider. Rayleigh waves can be produced using piezoelectric transduction, such as using an IDT as described herein. IDT can radiate a longitudinal Rayleigh wave (SAW) 416 into a liquid contaminant droplet 410 when a SAW 416 propagates at the liquid/solid interface. As shown, air 422 or other surrounding gas or fluid can be located above the substrate 424, as shown. The density of the air 422 can affect the properties of the Rayleigh wave 416. The Rayleigh wave 416 may exert a force (F) on a contaminant droplet 410. The force exerted by the Rayleigh wave 416 can be defined by the following formula:

$$F=\rho(1+\alpha^2)^{3/2}A^2\omega^2 k_i \exp 2(k_i x + \alpha k_i y).$$

And, the amplitude of the SAW 416 at a point of interaction, at which point SAW 416 preferably becomes a leaky SAW 418, with contaminant droplet 410 can be defined by the following formula:

$$\frac{A}{\lambda} = 8.15 \times 10^{-6} P_D^{0.225} + 5 \times 10^{-6} P_D^{0.8}$$

Where $P_D$ is SAW 416 input power, and α=acoustic absorption factor.

When the Rayleigh wave (SAW) 416 input power (either measured at the input IDT or the wave itself) is increased beyond a "critical" value, e.g., by passing higher voltage through an input IDT that produces the Rayleigh wave, the wave may cause a pressure gradient inside the contaminant droplet 410 to be larger than the surface tension (as a function of the properties of the contaminant droplet 410 and the air 422). At the critical value of the input power of the Rayleigh wave, the contaminant droplet 410 can be moved along a wave propagation direction (to the right, as shown), which can have an associated Rayleigh angle ($\theta_R$), described with reference to FIG. 3, above. Various SAW 416 input power levels can have different effects on a contaminant droplet 410, such as causing a recirculation 414 (e.g., heating), and a streaming 412 of the droplet 410. At a point of interaction with the droplet 410, the SAW 416 may become a leaky SAW 418, as described herein. Further variations of effects of SAW-droplet interaction can be further seen with respect to FIG. 5. The force ($F_s$) necessary to overcome the liquid surface tension is given by:

$$F_s = 2R\gamma l v \sin\left(\frac{\theta_a + \theta_r}{2}\right)(\cos\theta_r - \cos\theta_a)$$

According to various embodiments, an advancing Rayleigh angle (e.g., $\theta_R=80°$), may be typical for viscous fluids on a solid substrate (or film) 424, e.g., ZnO. A maximum surface tension of a contaminant droplet 410 may be roughly 0.0008 millinewtons (mN) for a contaminant droplet 410 with a diameter of 40 micrometers and seven micrometers in height. Also, according to the formula, as Rayleigh (SAW) 416 power increases, contact Rayleigh angle 420 hysteresis ($\theta_a - \theta_r$) also increases and the contaminant droplet 410 can move to minimize its own interface with the solid substrate 424. As the contaminant droplet 410 moves, the contaminant droplet 410 can be actuated (e.g., moved) along the x-axis, as shown, and therefore caused to be removed from the solid substrate 424. Conversely, if Rayleigh wave 416 power decreases, the contact angle 420 hysteresis can also decrease. At lower Rayleigh wave 416 power, the actuation of the droplet 410 can include recirculation and/or streaming of the droplet 410, as shown, and as further described with respect to FIG. 5, below.

An approximation of propulsive force ($F_{stream}$) applied to the contaminant droplet 410 can also be expressed as:

$$F_{stream} = \alpha(V - V_{thresh})^2 \left(\frac{\sin\beta(V - V_{thresh})}{(V - V_{thresh})}\right)^2$$

In various embodiments, and according to the above formulas, approximately 2-3 V of applied RF voltage at 250 MHz frequency can meet the voltage threshold ($V_{thresh}$) that causes propulsion of the contaminant droplet 410, e.g., in the form of removal toward various sides of a TE. According to some embodiments, once the contaminant droplet 410 starts moving, viscous dissipation of the SAW energy within the droplet 410 volume as well as shear stress at a droplet-substrate contact may affect results.

An amplitude (A) of an example SAW can have an amplitude expressed empirically as:

$$A=\lambda(8.15\times1.0^{-6}P^{0.225}+5\times10^{-6}P^{0.8})$$

Likewise, SAW energy transmitted per second ($E_{in}$) to the contaminant droplet 410 can be expressed as:

$$E_{in}(2\pi^2 d\rho_f V_R^3 A^2/\lambda)$$

According to various embodiments, inside the contaminant droplet 410, the SAW 416 amplitude can decay in the direction of propagation (here, to the right). Typically, the decay is 1/e of incidental value over several SAW wavelengths. According to testing, average energy transferred to the contaminant droplet 410 can be approximately 50% of the total wave energy. Furthermore, a SAW attenuation factor can be given by:

$$\alpha_L = \frac{\rho_f V_f}{\rho V_R \lambda}$$

An estimate of contaminant droplet 410 propulsion speed ($V_{propulsion}$) can be expressed as a function of applied (RF) SAW power, as:

$$V_{propulsion} = \left(-F_s + \sqrt{F_s^2 + 4\beta E_{avg}}\right)/2\beta$$

Where:

$$\beta = \mu\left(\frac{\pi d^2}{4}\right)\!\Big/(h/2)$$

For the above, P=applied (RF) SAW power, L=SAW wavelength, $\rho_f$=density of contaminant droplet 410, $\rho$=density of (e.g., ZnO) film, $V_R$=SAW speed in film, A=SAW amplitude, d=contaminant droplet 410 diameter, h=height of contaminant droplet 410, $\mu$=contaminant droplet 410 viscosity, $V_f$=acoustic speed in contaminant droplet 410, and $F_S$=surface tension of contaminant droplet 410.

Figure 5:
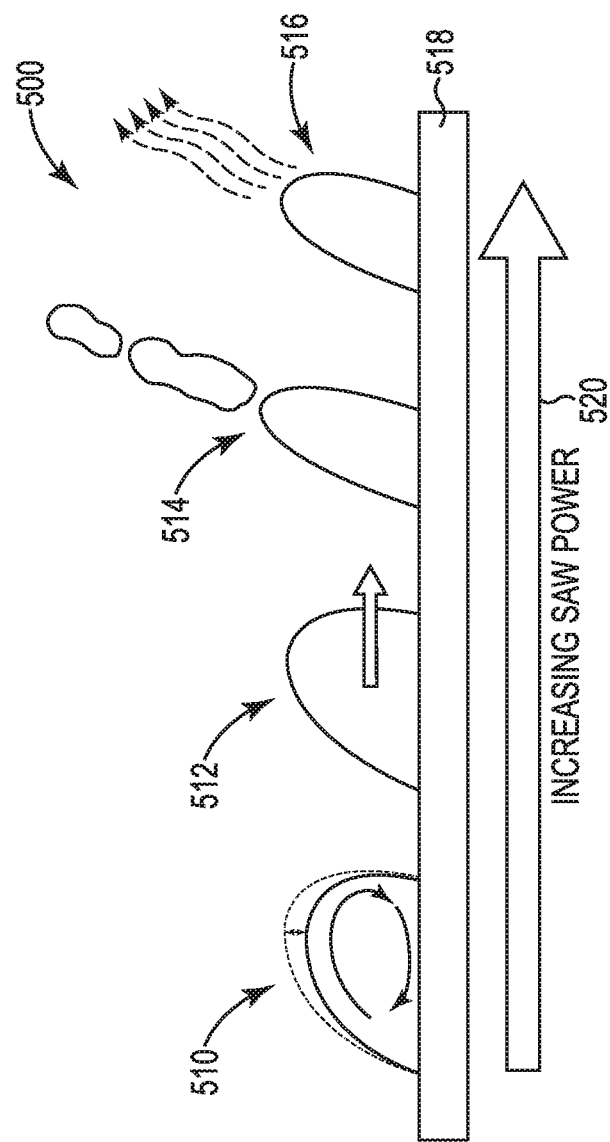
FIG. 5 is a representation of various power levels of a SAW as applied to a contaminant droplet, according to various embodiments.

FIG. 5 is a representation of various power levels 500 of a SAW as applied to a contaminant droplet (e.g., contaminant droplet 410 of FIG. 4), according to various embodiments.

As described with respect to FIGS. 3 and 4 in particular, a contaminant droplet (e.g., 318, 410) may be located and sensed on a surface of a piezoelectric substrate 518. Various SAW power levels during actuation have varying effects on an example contaminant droplet, and arrow 520 represents increasing SAW power for actuation, from left to right. SAWs used for sensing would have lower power levels than shown with respect to FIG. 5 so as to detect the contaminant droplet without immediately actuating it. Logically, as greater amounts of power and force are applied to a contaminant droplet, the SAW tends to cause greater actuation of the contaminant droplet.

At 510, a low SAW power level causes a contaminant droplet to vibrate or circulate (e.g., heating). At 510, the droplet may not displace or actuate to the point of being removed from substrate 518, but the droplet may undergo internal shifting and movement. At 512, an increase d SAW power level causes the droplet to actuate or move by the forces described above, such as may be used to shift contamination from one area of a surface to another. At 514, further increased SAW power, as shown, causes droplet jetting. Droplet jetting occurs when a droplet on the substrate 518 to become airborne and displace at least partially vertically, e.g., due to power transferred to the droplet via SAW that exceeds a surface tension of the droplet. At 516, which can represent an even high incident SAW power than 514, a contaminant droplet is atomized. Droplet atomization occurs when the droplet receives a very high power SAW, and the droplet's surface tension is heavily disintegrated, separating the droplet into very fine particles. If the droplet is atomized in this way, subsequent contaminant droplet build-up and reconstitution on the surface are relatively less likely to occur in the future.

Turning now to FIGS. 6-12, various slider TE configurations and views are shown. In the various configurations, bond pads 10 are typically located near the top of the TE (as shown), and electronic lapping guides (ELGs) 12 are shown below the bond pads 10. At the top of the TE can be a surface, referred to herein as a TE surface. The area of a TE located below ELG 12 is the primary area of focus of this disclosure, with the notable exception of FIG. 12.

As described herein, one or more IDTs can be located on or in a slider, and in particular on or in a slider TE. FIGS. 6-12 shows IDT(s) as visible, and according to various embodiments the IDT(s) can be visible, hidden, or visible only using certain equipment. As described below, the IDT and SAW-based structures and devices can be manufactured according to various methods and structures, as suitable. Preferably, embodiments described herein use surface-based Rayleigh waves, which can benefit from IDTs being located on or near a TE surface, but according to other embodiments, Lamb or other waves (multiple wave layers, or waves below a surface) can be used, and the IDTs can be located further beneath various slider surfaces, including a TE. For the purposes of illustration, the various IDTs, reflectors, and other components are shown as being visible, but this is not to be construed in a limiting sense and is shown for illustrative purposes.

In particular, two basic approaches are considered for the fabrication of slider and other device configurations, as described herein. A first approach includes fabricating a device (e.g., an IDT) as a thin-film sensor (e.g., ZnO, AlN, PZT, etc.). This approach may be similar to depositing one or more IDTs on a thin-film piezoelectric substrate of a slider. Once deposited on the substrate, various protective coatings can be applied over the IDT and any other surfaces or devices. A second approach can include fabricating a SAW device (e.g., IDT, etc.) separately, which can be solder bonded to a TE of the slider. According to various embodiments, bulk piezoelectric substrates such as PZT, single-crystal LiTaO$_3$, single-crystal LiNbO$_3$, quartz, etc. may be preferable options for a bulk piezoelectric substrate material. The second approach may provide increased flexibility with respect to design and configuration. Various embodiments may utilize configurations that can provide larger acoustic streamlining forces than the firm approach and ZnO-based devices, for instance.

Control of the various sensing/actuation functions of the various IDTs described with respect to FIGS. 6-9 can utilize various controllers that can include processors operatively coupled to memory and/or storage devices in order to perform the various functions described herein. Detectors sense something, decide to remove, etc. Examples of operative IDT and controller schematic configurations are described in more detail with respect to FIGS. 11 and 12, but other control schemes can also be applied, as suitable. In some embodiments, a controller can initiate a sensing operation using one or more IDTs, followed by an actuation operation using the one or more IDTs. The actuation operation can utilize sensed properties of contaminant droplets in order to actuate the contaminant droplets, according to various embodiments, and as described herein.

Figure 6:
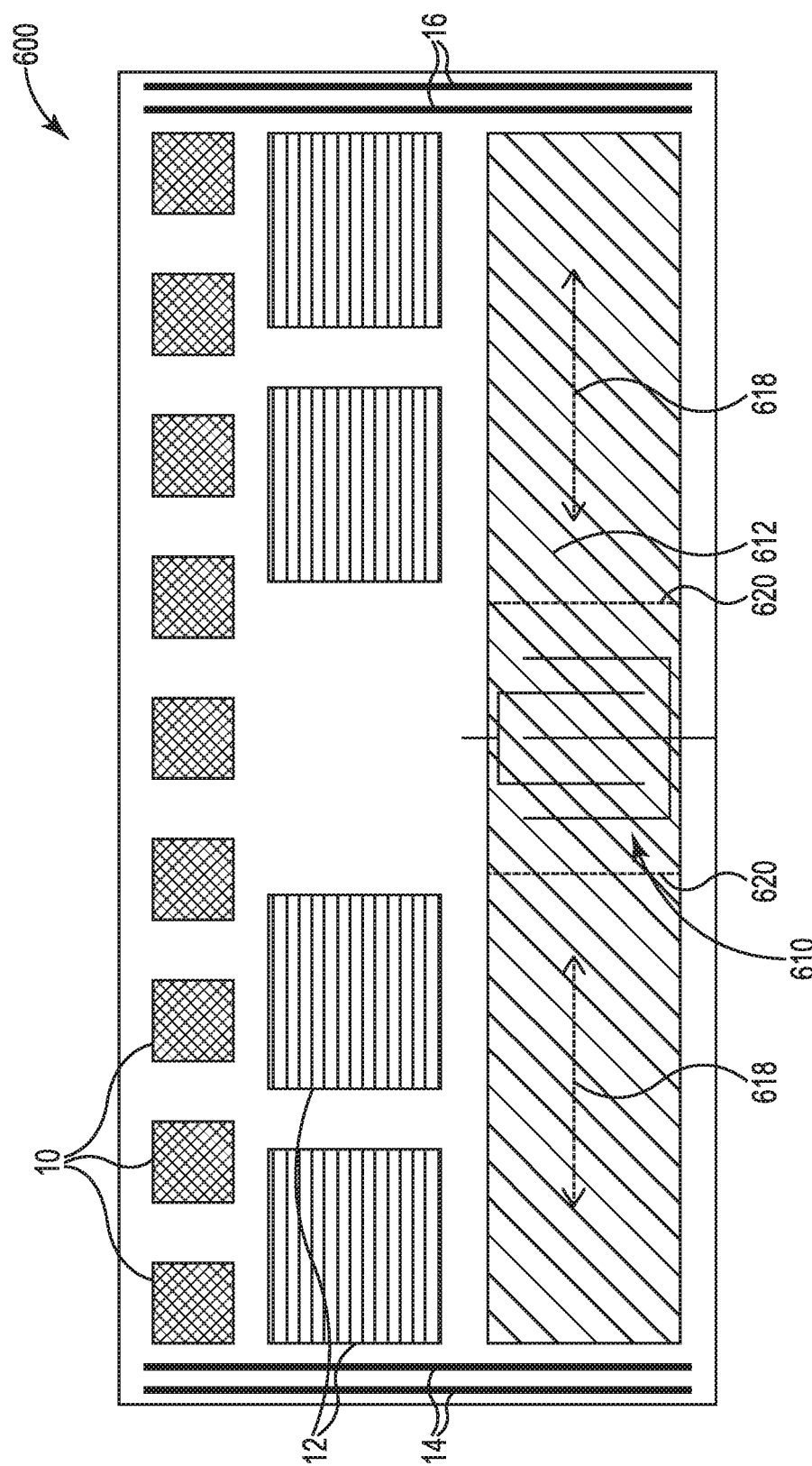
FIG. 6 is a first embodiment of a TE of a slider configured to use SAWs to sense contaminants droplets located on the TE.

FIG. 6 is a first embodiment of a TE 600 of a slider configured to use SAWs to sense contaminants droplets located on the TE 600. The following embodiments are preferably utilized for detection of contaminant droplets on the slider TE 600. The TE 600 embodiment shown may be a resonator, according to various embodiments.

According to one variation, an input electrical signal applied to the single input/output IDT 610 forms a mechanical SAW (described above) in the piezoelectric resonator 612 that travels along the surface on both (left and right) sides from the IDT 610 as conceptually illustrated by bi-directional propagation arrows 618. The wave(s) reflect from reflective arrays 14, 16 (e.g., metal stripes or grooves) and travel back to the IDT 610 after a period of time has elapsed, which transforms the SAW(s) back to an electrical signal that can then be sensed and/or analyzed. The presence of a liquid contaminant droplet or film (not shown) may cause attenuation of amplitude of the wave (e.g., in the form of a leaky SAW) as well as change in wave velocity or other characteristic. The change in the wave velocity, in particular, may result in a signal delay (hence the term delay line, as described herein), which can be sensed through a frequency change of the received wave as compared to the original, transmitted wave.

An example SAW (e.g., a Rayleigh wave) can propagate through most elastic materials including metals and insulators, without a uniform piezoelectric or purpose-designed flexible substrate. As a result of the aforementioned SAW property, and according to another variation of the shown layout, the piezoelectric resonator 612 can be confined to be covering just the IDT area (horizontal borders of which are defined as shown by dotted two lines 620), permitting SAWs to exit the piezoelectric substrate, and pass through other substances, before re-entering the piezoelectric substrate.

According to a third variation of the shown layout, IDT 610 can produce a shear-horizontal (SH)-SAW where a wave has shearing wave properties horizontally with respect to a surface of propagation. An SH-SAW may have lower radiation losses into a liquid contaminant droplet or layer when compared to a Rayleigh wave. A SH-SAW may also have improved sensitivity to contaminant droplet detection. To generate a SH-SAW instead of a Rayleigh wave, the substrate construction depicted in FIG. 10 can be adopted to the sensing region.

According to various embodiments, an IDT 610 (or other IDTs, herein) can have a particular geometry. The IDT 610 geometry can maximize an IDT 610 aperture (i.e., length), however space for the IDT 610 can be constrained by bond-pads and/or ELG pads located below the IDT 610. In addition, a "center" frequency ($F_0$) can be chosen for the IDT 610 to be maximized without contaminating a writer, reader, or other sensor signals of an associated slider. This can be referred to as frequency separation.

According to one preferable example, $f_0$=250 MH, SAW velocity in Zn) is 2,700 m/s, IDT 610 pitch and SAW wavelength are 10.8 micrometers, IDT 610 thickness is half of a corresponding substrate thickness, or about 1-2 micrometers, the IDT 610 length is about 30 micrometers, and the IDT 610 width is about half the IDT 610 pitch, or about 5.4 micrometers. Many variations of the above are contemplated herein.

Figure 7:
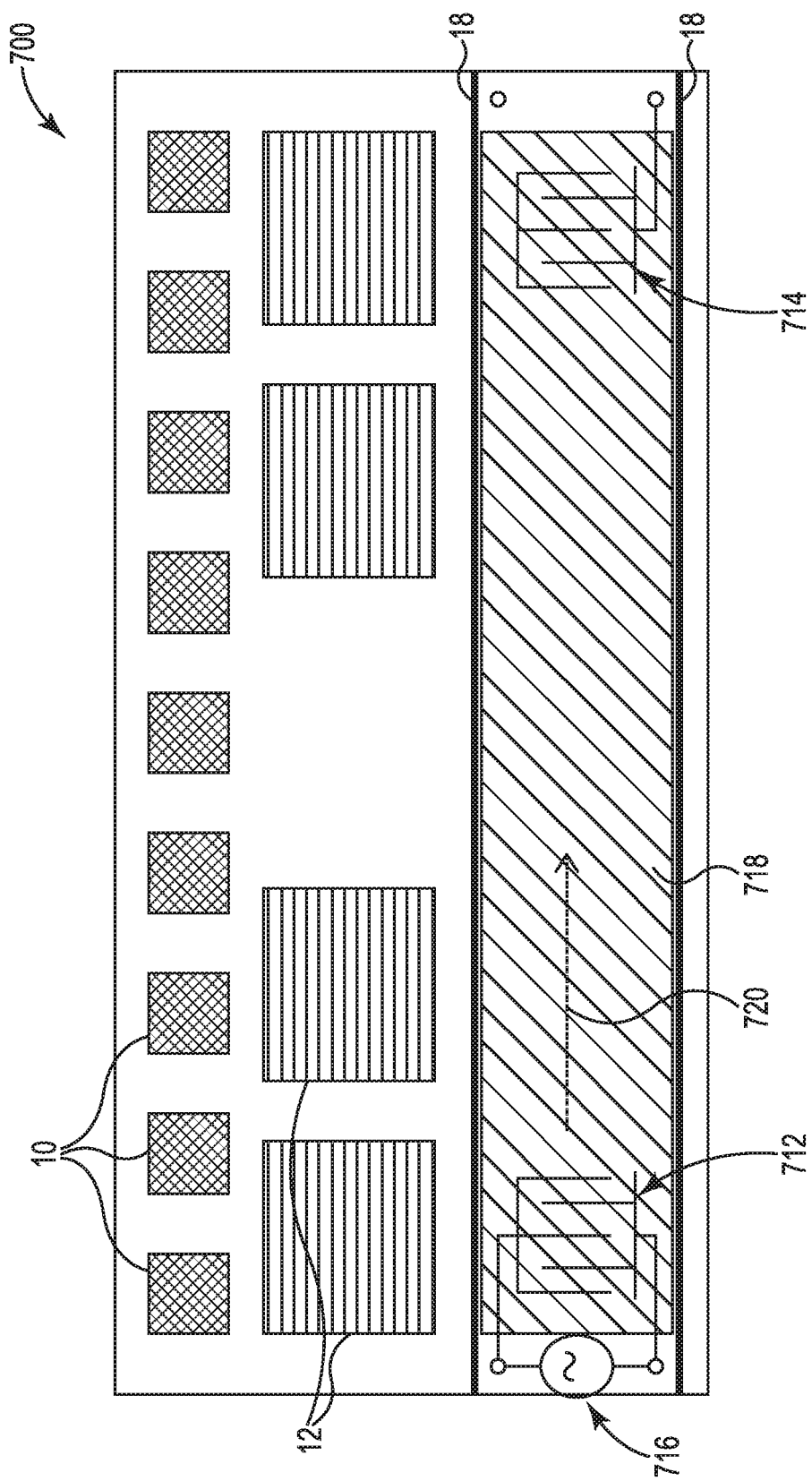
FIG. 7 is a second embodiment of a TE of a slider configured to use SAWs to sense and/or actuate contaminant droplets located on the TE.

FIG. 7 is a second embodiment of a TE 700 of a slider configured to use SAWs to sense and/or actuate contaminant droplets located on the TE 700. The following embodiments are preferably utilized for detection or actuation of contaminant droplets on the slider TE 700 and may form a delay line configuration, as described herein.

TE 700 can be similar to TE 600, but includes a pair of IDTs 712, 714, as well as optional micro-channel wave guides 18. Micro-channel wave guides 18, if present, may guide and direct a propagating SAW through confinement and added pressure gradient due to a so-called "capillary" effect. As shown, if a contaminant droplet (or a contaminant layer) is present on TE 700, the contaminant droplet may attenuate an incoming SAW amplitude sensed at output IDT and may also cause a frequency shift in the SAW delay line (defined by a distance in a substrate through which the SAW travels), which can be used for contaminant-sensing purposes.

In other embodiments where optional micro-channel wave guides 18 are omitted and droplet actuation is desired, a large enough input power from IDT 712 to the sensed contaminant droplets (if present) can be applied via SAW 720, propelling the contaminant droplets away along the direction of wave propagation 720 using acoustic streaming, towards the side faces (left and right edges of the TE, as shown) and away from the input IDT 712.

According to one embodiment, a delay line 718 (located between IDT 712 and IDT 714) can include coated piezoelectric substrate or film with a hydrophobic coating configured to reduce surface energy, and thereby lowering the power required for SAW-based actuation. Various coatings can also be present during sensing operation, according to various embodiments. Examples of hydrophobic coatings that may be utilized include SAM, graphite fluoride (a-CFx), polyvinylidene fluoride (PVDF), or polytetrafluoroethylene (PTFE), among others.

According to various embodiments, the roles of input 712 and output 714 IDTs can be interchanged, but one configuration has been shown as an example. Through a determination of the nearest side face (left or right), the opposite-end IDT can be configured to be the input IDT in order to propel the contamination droplets towards the nearest side face (i.e., along a shorter distance), away from the input IDT. In so doing, expulsion of contaminant droplets from TE region may be expedited. According to various embodiments, sensing and input circuitry may need to be duplicated at both respective TE ends, which may add complexity to various embodiments.

As in FIG. 6, Rayleigh waves can propagate effectively through most elastic materials including metals and insulators (e.g., aluminum), and the piezoelectric layers can be confined to just the regions beneath and/or surrounding the input/output IDTs 712/714. Also as in FIG. 6, SH-SAW waves may have lower radiation losses into a liquid contaminant droplet or layer, and may have better improved sensitivity to contaminant droplet detection. To generate SH-SAW instead of Rayleigh wave, the substrate construction depicted in FIG. 10 can be adopted to the sensing region.

Figure 8:
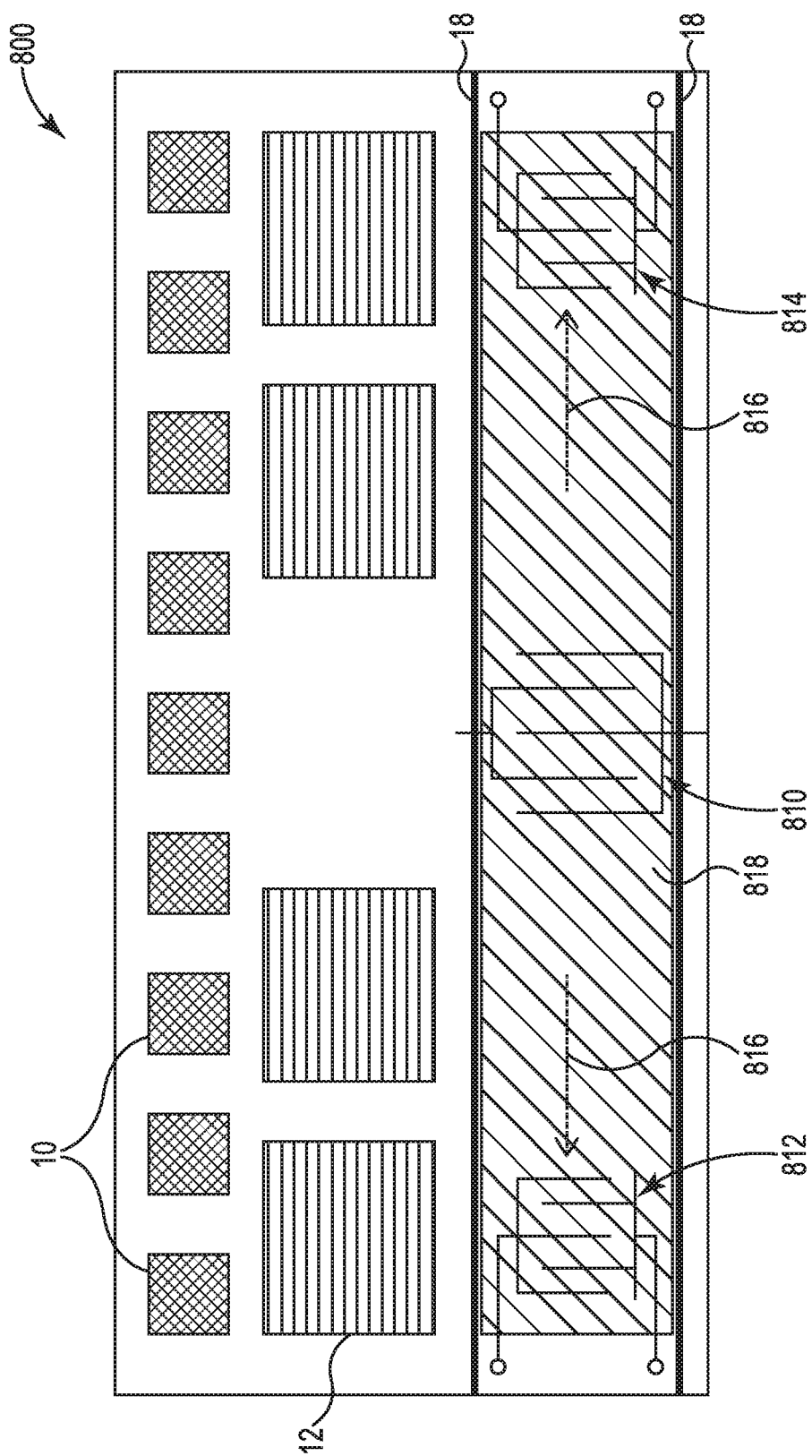
FIG. 8 is a third embodiment of a TE of a slider configured to use SAWs to sense and/or actuate contaminant droplets located on the TE.

FIG. 8 is a third embodiment of TE 800 of a slider configured to use SAWs to sense and/or actuate contaminant droplets located on the TE 800. The following embodiments are preferably utilized for detection and/or actuation of contaminant droplets on the slider TE 800.

Shown in a three-IDT TE layout, where one, central input IDT 810 is located approximately midway between two output IDTs 812, 814. Propagating SAWs 816 are shown traveling between central input IDT 810 and the two output IDTs 812, 814. Using the shown configuration, the presence of contaminant droplets on either half of the slider width can be effectively sensed. SAWs 816 produced by IDT 810 can propel contaminant droplets (not shown) away from the IDT 810 using acoustic streaming (sufficiently high power input applied to input IDT at the center) along both directions, as described herein.

Micro-channel wave guides 18, as shown and described with respect to FIG. 7, may guide and direct a propagating SAW through confinement and added pressure gradient due to a so-called "capillary" effect. As shown, if a contaminant droplet (or a contaminant film or layer) is present on TE 800, the contaminant droplet may attenuate SAW amplitude sensed at output IDT and may also causes a frequency shift in the SAW delay line (distance in substrate through which the SAW travels), which can be used for contaminant-sensing purposes.

Even if optional micro-channel wave guides 18 are omitted, applying a large enough input power to the sensed contaminant droplets (if present) can be propelled away along the directions of wave propagation 716 using acoustic streaming, towards the side faces and away from the central input IDT 810.

As described with respect to FIG. 7, the piezoelectric delay line(s) 818 can be a coated piezoelectric substrate or film with a hydrophobic coating (as described, above) configured to reduce surface energy, and thereby lowering the power required for SAW-based actuation. The delay line(s) 818, as shown, can be located between IDT 810, 812, and/or 814.

Figure 9:
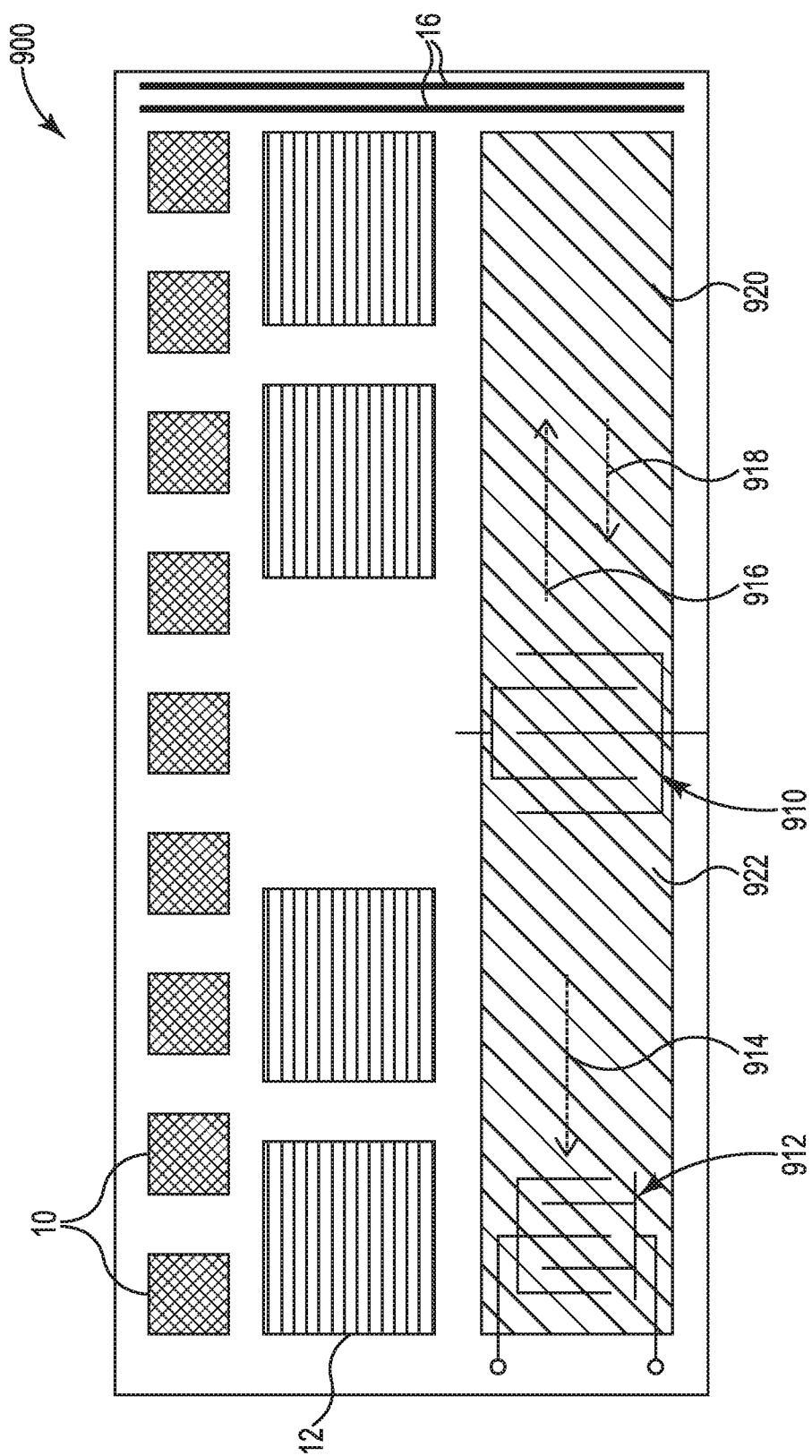
FIG. 9 is a fourth embodiment of a TE of a slider configured to use SAWs to sense and/or actuate contaminant droplets located on the TE.

FIG. 9 is a fourth embodiment of a TE 900 of a slider configured to use SAWs to sense and/or actuate contaminant droplets located on the TE 900. The following embodiments are preferably utilized for detection or actuation of contaminant droplets on the slider TE 900.

TE configuration 900 is conceptually and structurally similar to a combination of the layouts shown with respect to FIGS. 6 and 8. Using a two-IDT configuration with a center input/output IDT 910 similar to the configuration of FIG. 8, one of the output IDTs is replaced instead with an acoustic reflector 16, as described in FIG. 6. The acoustic reflector may be a metal stripe or groove and may be configured to reflect a SAW from IDT 910 back to IDT 910.

By employing such a hybrid configuration (combining a delay line 922 and resonator 920 configuration), contamination droplets can be sensed on either half of the slider TE width using the direct-incident (two IDTs 910, 912) and reflected SAW (IDT 910 only). As shown, contamination droplets can be propelled away from the central input IDT 910 region using acoustic streaming of sufficiently power input applied to center input IDT 910, along both directions.

Figure 10:
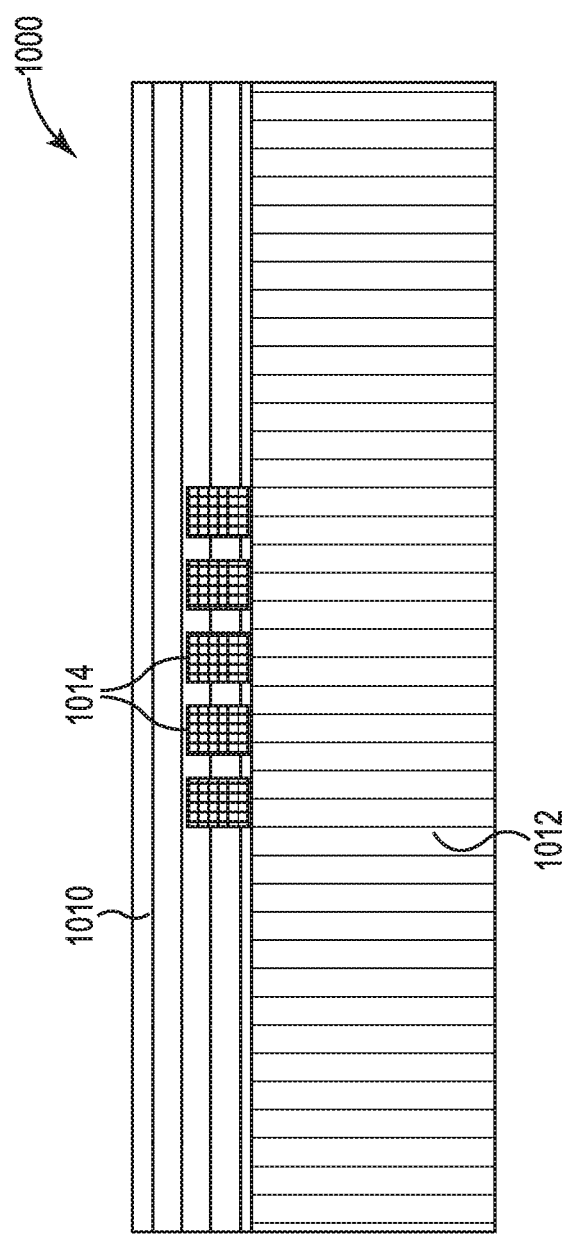
FIG. 10 is a cross-sectional view of an example wave guiding layer of a substrate for use in a TE with a SH-SAW wave propagation.

FIG. 10 is a cross-sectional view of an example wave guiding layer of a substrate 1000 for use in a TE with a SH-SAW wave propagation.

As discussed, since Rayleigh waves can propagate effectively through most elastic materials including metals and insulators (e.g., alumina) the piezoelectric layers can be confined to just the regions beneath the IDTs. However, an alternate type of SAW, SH-SAW waves, have lower radiation losses into a liquid contaminant droplet or layer, and hence may have better sensitivity to contaminant droplet detection.

To generate a SH-SAW instead of a Rayleigh wave, a construction can be adopted to the sensing region that includes a wave guiding layer 1010, which can be composed of, e.g., SiO2, ZnO, polymer layers, etc., which may contain IDT electrodes 1014 within the wave-guiding layer 1010, as described herein. A piezoelectric substrate 1012 is located below wave guiding layer 1010, and may be in contact with IDT electrodes 1014 as well as the wave-guiding layer 1010.

Figure 11:
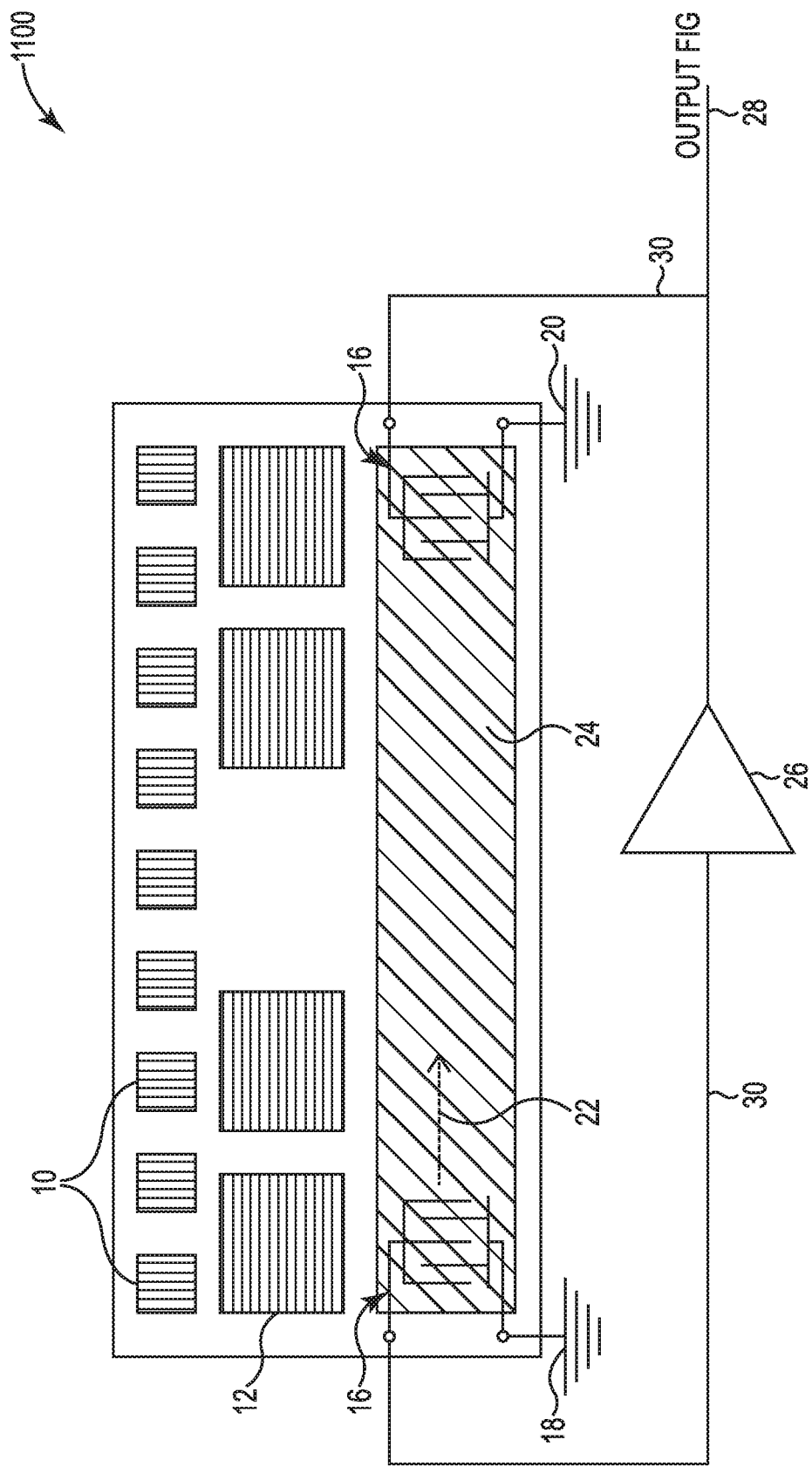
FIG. 11 is a generalized embodiment of a TE oscillator circuit of a slider configured to use SAWs to sense contaminant droplets located on the TE.

FIG. 11 is a generalized embodiment of a TE oscillator circuit 1100 of a slider configured to use SAWs to sense contaminant droplets located on the TE 1100. The following embodiments may be preferably utilized for detection or actuation of contaminant droplets on the slider TE 1100, and may represent delay line embodiments.

As shown, an oscillator circuit is formed by grounds 18, 20, electrically connected to respective input and output IDTs 14 and 16, along with wiring 30 configured to connect IDT 14 to RF amplifier component 26. An output signal 28 is produced by the input IDT 14 amplified output by amplifier 26, when electrically connected to output IDT 16. The oscillator circuit places a two-port (i.e., a two IDT) delay line SAW piezoelectric device in the feedback loop of an RF amplifier. According to one example, where amplifier 26 has function A(f), and delay line 24 has function B(f), the condition for the oscillation is $A(f) \cdot B(f) = -1$, from which $|A(f) \cdot B(f)| = 1$ is found for the loop gain and for the loop phase arg $A(f) \cdot B(f) = -2\pi n$, where n is an integer. According to various embodiments, $\Delta f/f_0$ (a ratio of change in SAW frequency to initial frequency) may be proportional to $\Delta v/v_0$ (a ratio of change in SAW velocity to initial velocity). By counting or measuring the oscillator frequency with a digital frequency counter may provide a precise indirect measurement of acoustic wave velocity, which may vary in the presence of a contaminant (e.g., in the form of liquid, droplets, or film), according to various embodiments.

The described methods and configurations, however, may be relatively insensitive to signal amplitude and hence may not be as sensitive to a capture effect of contaminant-induced attenuation, according to various embodiments. The described methods and configurations may rely on detecting change in acoustic velocity and/or the change in acoustic velocity's effect on signal frequency measured using the oscillator circuit at output 28.

Figure 12:
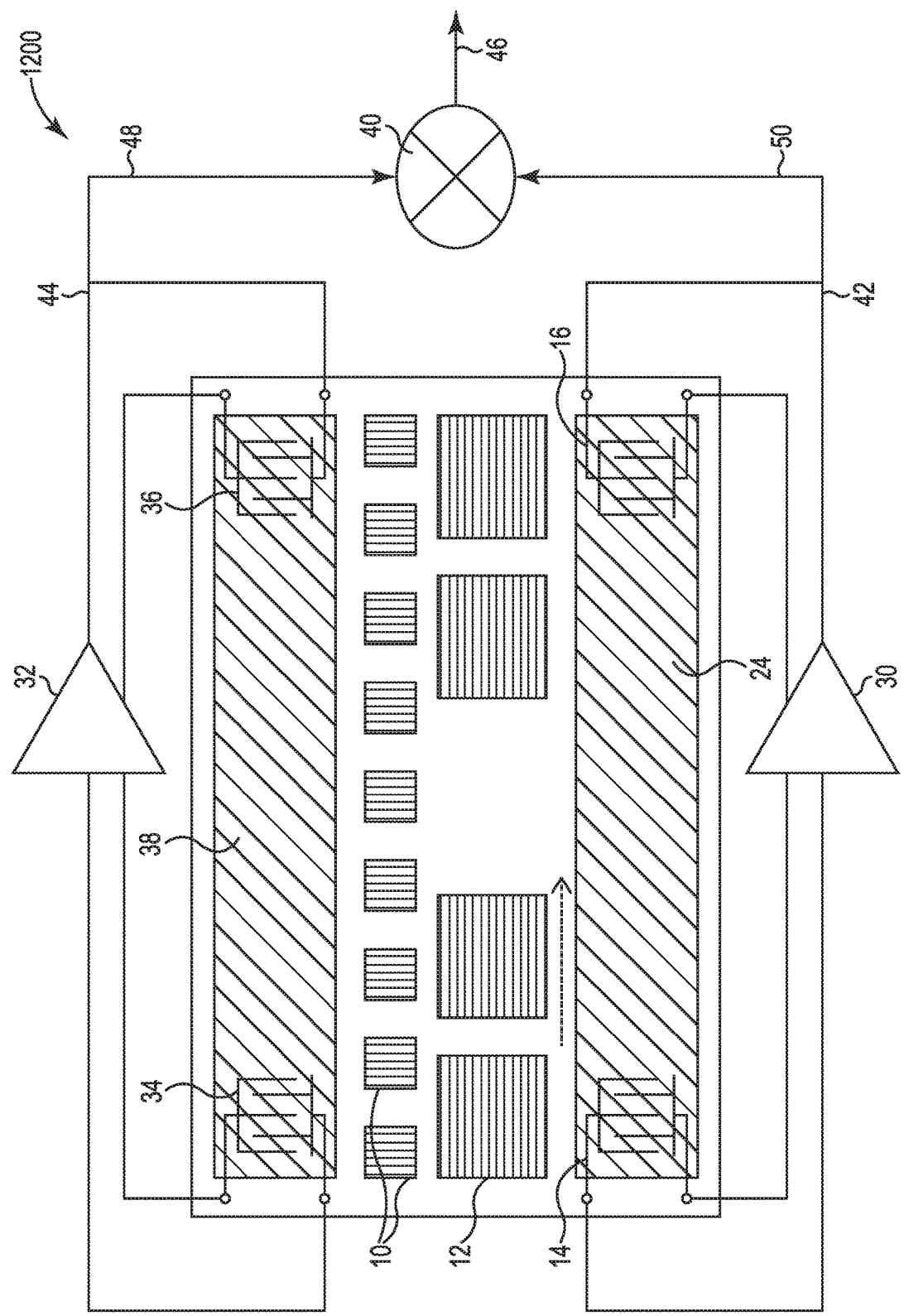
FIG. 12 is an embodiment of a TE configured to use a differential scheme for common-mode noise and thermal compensation.

FIG. 12 is an embodiment of a slider TE 1200 configured to use a differential scheme for common-mode noise and thermal compensation, according to various embodiments.

Shown is a variation of a TE differential scheme and configuration that uses a dual-channel, two-port SAW delay line configuration to compensate for common-mode noise, thermal effects, and viscosity effects.

Similar to other embodiments, a first, sensor delay line 24 is located on a lower end of the TE face. The sensor delay line 24 includes IDTs 14 and 16, e.g., with one input IDT and one output IDT. A sensor portion of a dual-channel circuit is formed by connecting the sensor IDTs 14, 16 via sensor wiring 42 to sensor amplifier 30 and eventually outputting a sensor signal 50 to a signal mixer 40. The signal mixer 40 may be a frequency mixer or other form of signal mixer, according to various embodiments.

Notably, in this embodiment, a second, reference SAW two-port delay line 38 is added to an upper end of the TE face. The second, reference SAW is shown as located above the bond pads 10 and ELG pads 12. According to various embodiment, the reference SAW delay line 38 is located relatively far from a disk surface (not shown), allowing a relatively contaminant-free operation. The reference delay line 38 has a parallel and matched pair of IDTs 34, and 36 intended to mirror the configuration of the sensor SAW delay line 24, with respective IDTs 14 and 16. A reference portion of a dual-channel circuit is formed by connecting the reference IDTs 34, 36 via reference wiring to reference amplifier 32 and eventually outputting a reference signal 48 to the signal mixer 40.

After the signal mixer 40 receives both the reference output signal 48 and the sensor output signal 50, the pair of signals can be compared and analyzed, and a differential output 46 can be produced. The differential output 46, based on the reference output signal 48 and the sensor output signal 50 can be calibrated to reduce and compensate for unwanted signal noise, such as due to thermal effects, environmental, and other noise factors through a differential scheme that uses the described dual-channel delay line configuration, using the sensor SAW delay line 24 in parallel with the reference SAW delay line 38. According to various embodiments, the reference SAW delay line may preferably be kept in a region not close to a region of interest (e.g., above the bond pads, as in this case).

As used herein, various embodiments described herein utilize various forms of SAWs. As used herein, SAWs can include Rayleigh waves, as described, but can also include Lamb, Love, flexural plate waves (a type of Lamb wave). As described, SH-SAW waves can also be generated and used according to various embodiments.

IDTs may preferably be used for SAW generation (and detection of leaky SAWs, etc.), as described. However, besides IDTs, wedge & comb-based transducers, piezoelectric thin films deposited on a substrate or bulk surface mode conversion using grooves or gratings can also be used.

As described herein, a hydrophobic coating of the transduction or droplet accumulation region may help increase droplet mobility and therefore reduce power required for propelling the droplets away from the transducer region.

In principle, the concepts described herein can also be used in mitigating contaminant droplet build-up on a slider ABS, however variations to implementation may be encountered.

For SAW excitation or propagation, substrates may preferably be formed of PZT, AlN, ZnO, $LiNbO_3$, $LiTaO_3$, $Li_2B4O_7$, $GaPO_4$, Langasite, etc.

Implementation of the proposed schemes and the SAW device structures may entail or demand variations and modifications to some wafer process steps and pre-amplification changes. However the changes may be similar in complexity and requirements to the other, existing schemes discussed in the background.

It is understood that numerous variations of SAW-based sensing and actuation of contaminant droplets on a slider could be made while maintaining the overall inventive design of various components thereof and remaining within the scope of the disclosure. Numerous alternate design or element features have been mentioned above.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Although certain features are described generally herein relative to particular embodiments of the invention, it is understood that the features are interchangeable between embodiments to arrive at an SAW-based sensing and actuation, and/or dispersing of contaminant droplets that includes features of different illustrated embodiments. It is further understood that although certain embodiments discussed above include using SAWs on a TE of a slider, other surfaces of a slider or other HDD component may be sensed and/or actuated using the disclosed methods and structures.

What is claimed is:

1. A method, comprising:
   producing a first surface acoustic wave (SAW) on a magnetic head slider using a first interdigitated transducer (IDT), wherein the SAW has a first set of wave characteristics;
   receiving the first SAW at a second IDT on the magnetic head slider;
   analyzing the SAW for a second set of wave characteristics; and
   determining, based on the analyzing, that a substance having at least one characteristic is located in a path of the SAW on the magnetic head slider.

2. The method of claim 1, further comprising:
   producing a second SAW on the magnetic head slider using the first IDT, wherein the second SAW is configured to actuate the substance based on the at least one characteristic of the substance.

3. The method of claim 1, wherein the first set of wave characteristics includes: a first amplitude, a first velocity, a first wavelength, a first phase, and a first direction of propagation.

4. The method of claim 1, wherein the second set of wave characteristics includes: a time delay, a second amplitude, a second velocity, a second wavelength, a second phase, and a second direction of propagation.

5. The method of claim 1, wherein the first SAW is used for sensing the substance, and the second SAW is used for actuating the substance.

6. The method of claim 1, wherein the substance is a contaminant.

7. The method of claim 1, wherein the first SAW is produced on a trailing edge of the magnetic head slider.

8. A head slider apparatus for use in a hard-disk drive, comprising:
   a controller in communication with a first interdigitated transducer (IDT) and a second IDT;
   a leading edge, a trailing edge, and an air bearing surface;
   the first IDT being located on the trailing edge and having a first interdigitated spacing configured to interface with a piezoelectric substrate to create a first surface acoustic wave (SAW) having an first wavelength and an first amplitude;
   the second IDT configured to receive the first SAW created by the first interdigitated transducer, the received first SAW having a second wavelength and second amplitude; and
   wherein the controller is configured to analyze the received first SAW by comparing the second wavelength to the first wavelength and the second amplitude to the first amplitude, to determine whether a contaminant is located on the trailing edge.

9. The head slider apparatus of claim 8, wherein if the controller determines that a contaminant is located on the trailing edge, then the controller is configured to cause the first IDT to interface with the piezoelectric substrate to create a second SAW, and wherein the second SAW is configured to actuate the contaminant.

10. The head slider apparatus of claim 9, wherein the second SAW is configured to actuate the contaminant by having a contact angle and power at a time of SAW incidence with the contaminant.

11. The head slider apparatus of claim 8, further comprising:
    an acoustic reflector configured to reflect the first SAW from the first IDT to the second IDT.

12. The head slider apparatus of claim 8, wherein the first IDT and the second IDT are the same IDT.

13. The head slider apparatus of claim 8, wherein if the controller determines that a contaminant is located on the air bearing surface, then the controller is configured to cause the first IDT to interface with the piezoelectric substrate to create a second SAW, wherein the second SAW is configured to actuate the contaminant.

14. A head slider apparatus for use in a hard disk drive, comprising:
    a controller in communication with a first interdigitated transducer (IDT) and a second IDT;
    a leading edge, a trailing edge, and an air bearing surface;
    the first IDT being located on the air bearing surface and having a first interdigitated spacing configured to interface with a piezoelectric substrate to create a first surface acoustic wave (SAW) having an first wavelength and an first amplitude;

the second IDT configured to receive the first SAW created by the first interdigitated transducer, the received first SAW having a second wavelength and second amplitude; and wherein the controller is configured to analyze the received first SAW by comparing the second wavelength to the first wavelength and the second amplitude to the first amplitude, to determine whether a contaminant is located on the air bearing surface.

15. The head slider apparatus of claim 14, wherein if the controller determines that a contaminant is located on the air bearing surface, then the controller is configured to cause the first IDT to interface with the piezoelectric substrate to create a second SAW, wherein the second SAW is configured to actuate the contaminant.

16. A method, comprising:
receiving a first set of wave characteristics;
determining, based on the first set of wave characteristics, that a substance having at least one characteristic is located on a trailing edge surface of a magnetic head slider; and
producing a first surface acoustic wave (SAW) on the trailing edge surface of the magnetic head slider using a first interdigitated transducer (IDT), based on the first set of wave characteristics such that the substance is actuated.

17. The method of claim 16, wherein the first set of wave characteristics is received at the first IDT.

18. The method of claim 16, wherein the first SAW has a second set of wave characteristics, and wherein the first SAW is used for actuating the substance.

19. The method of claim 16, wherein a second SAW comprises the first set of wave characteristics, and wherein the second SAW is used for sensing the substance.

20. The method of claim 16, wherein the first set of wave characteristics includes: a first amplitude, a first velocity, a first wavelength, a first phase, and a first direction of propagation.

* * * * *